Nov. 11, 1952     O. D. MURRAY     2,617,203
DRIER
Filed Oct. 13, 1948     7 Sheets-Sheet 1
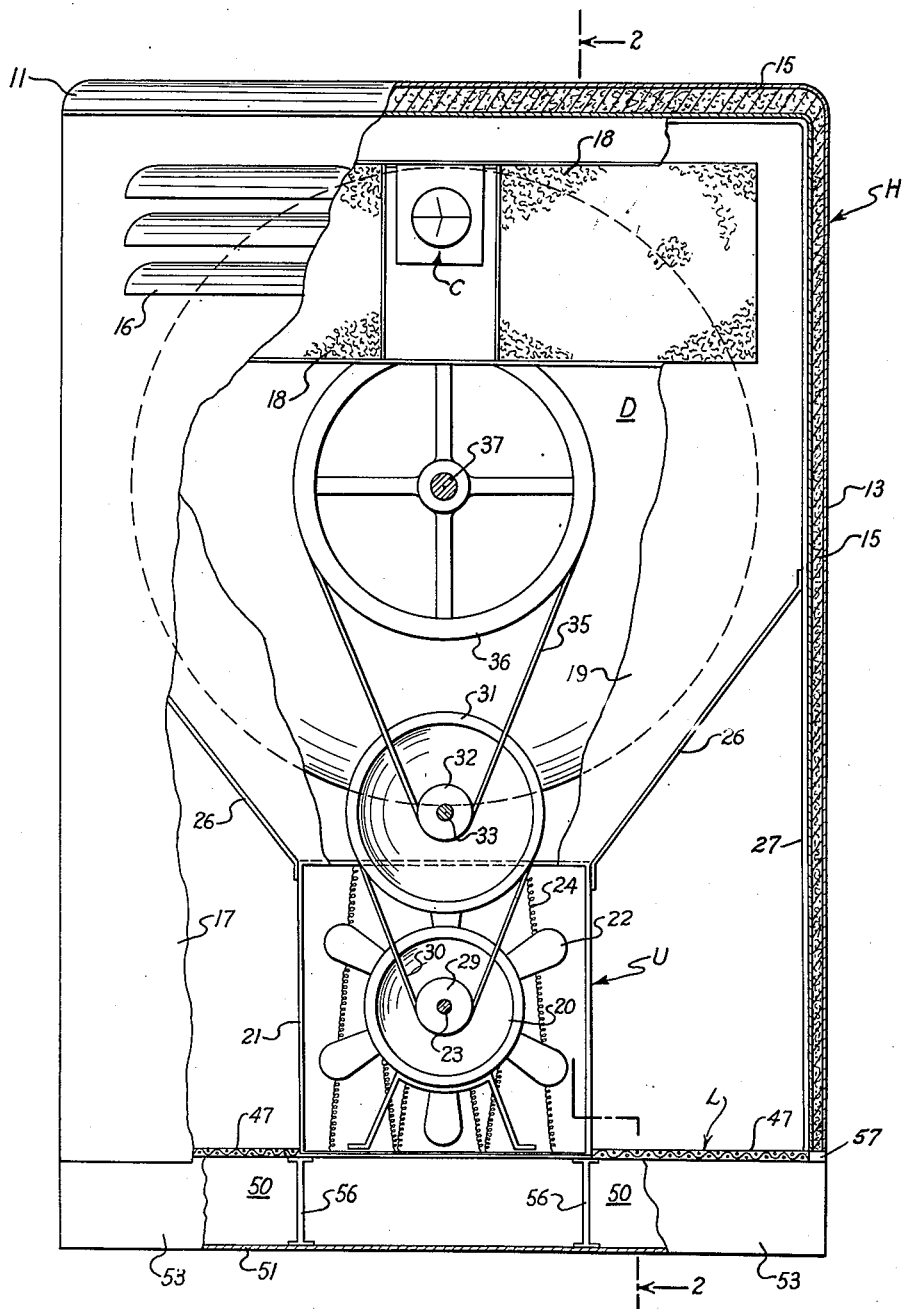
FIG.—1
INVENTOR.
Orval D. Murray
BY
Lanaphere and Van Valkenburgh
ATTORNEYS

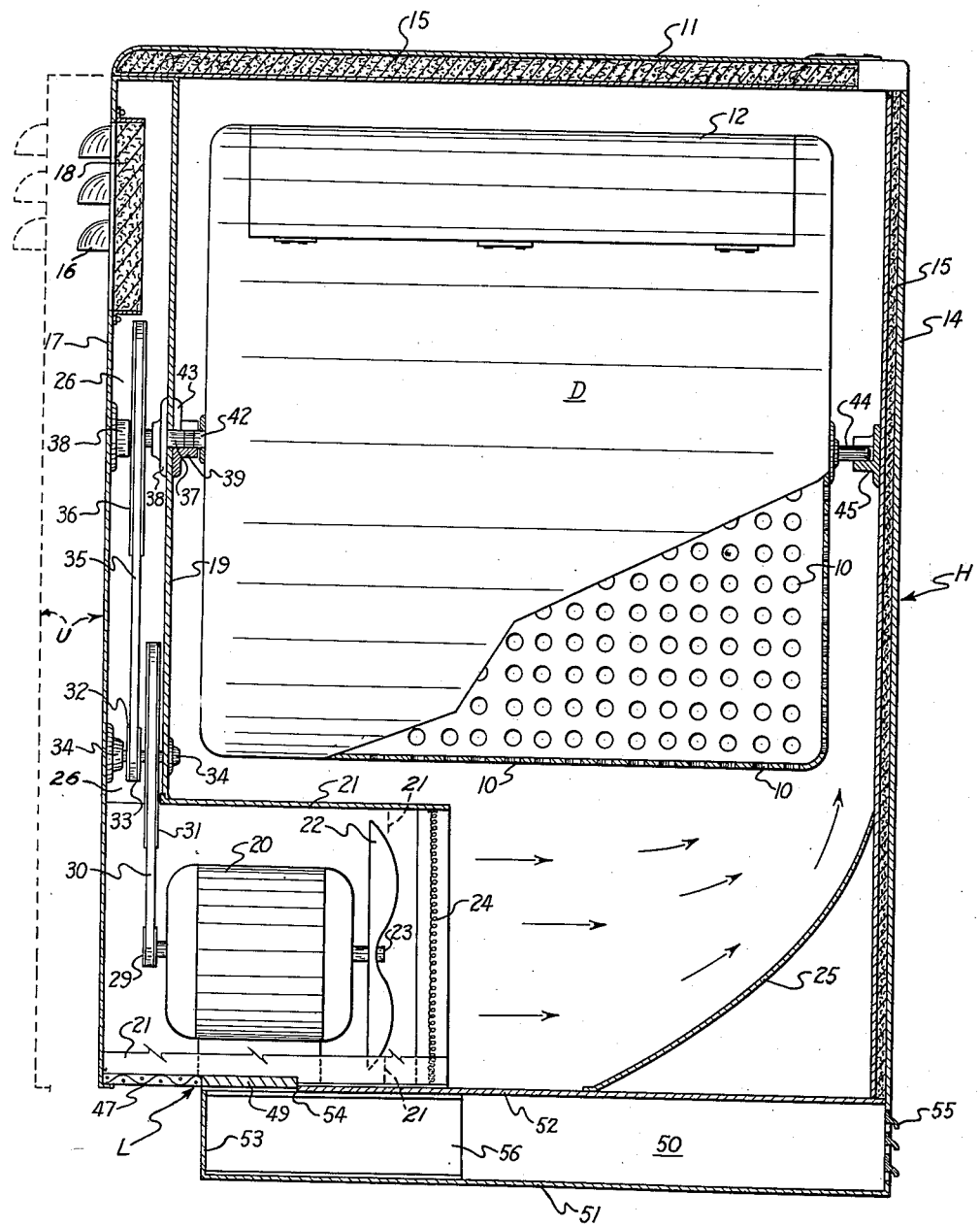
FIG.—2

Nov. 11, 1952     O. D. MURRAY     2,617,203
DRIER
Filed Oct. 13, 1948     7 Sheets-Sheet 3
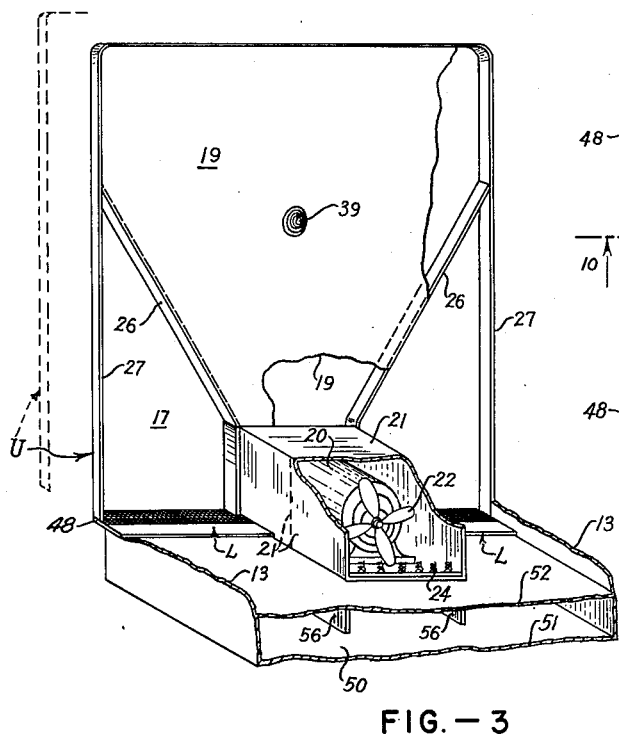
FIG.—3
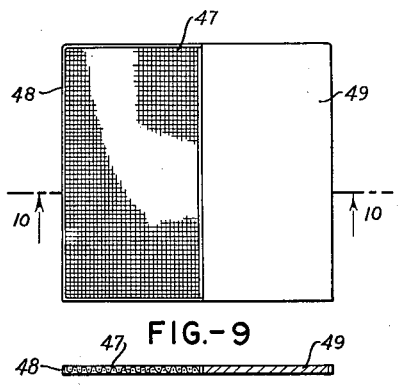
FIG.—9
FIG.—10
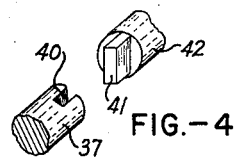
FIG.—4
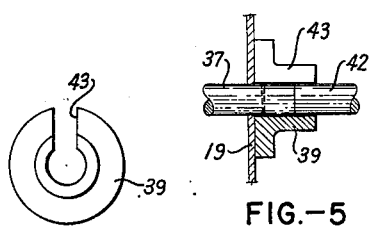
FIG.—6     FIG.—5
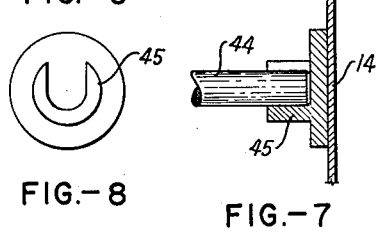
FIG.—8     FIG.—7
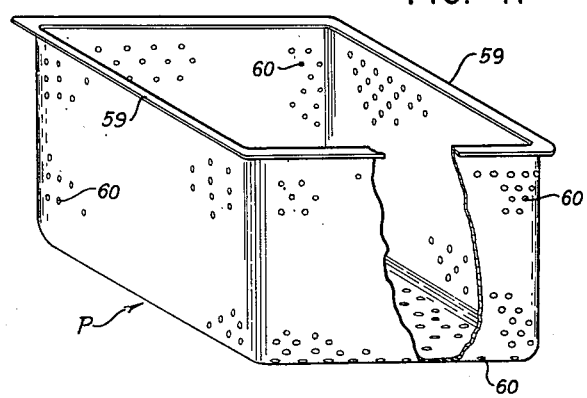
FIG.—11
FIG.—12
INVENTOR.
Orval D. Murray
BY
Lamphere and Van Valkenburgh
ATTORNEYS Nov. 11, 1952     O. D. MURRAY     2,617,203
DRIER
Filed Oct. 13, 1948     7 Sheets-Sheet 4
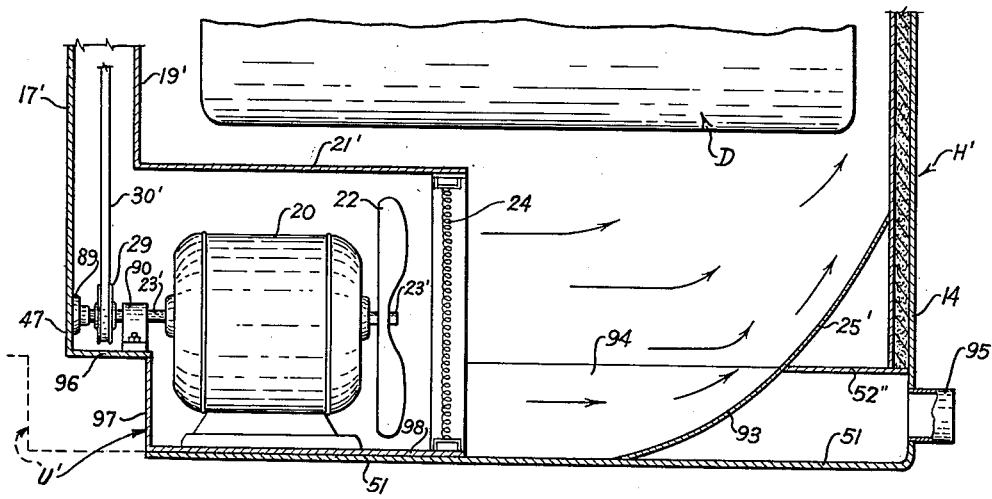
FIG.—19
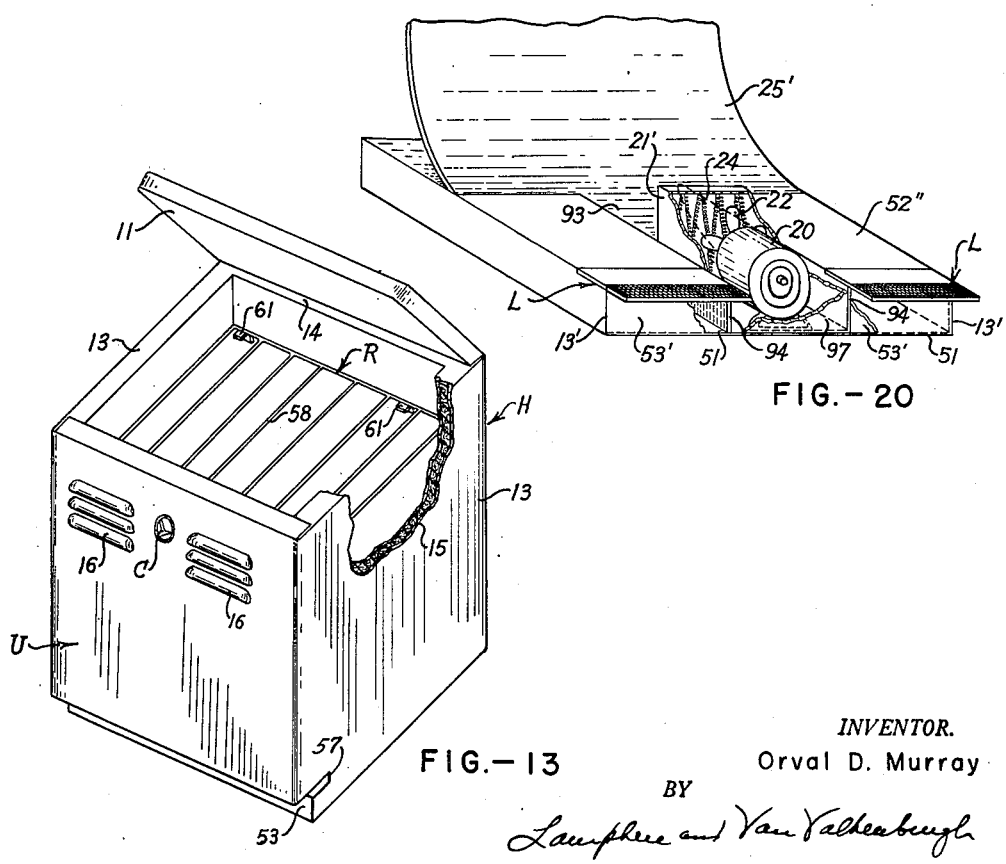
FIG.—20
FIG.—13
INVENTOR.
Orval D. Murray
BY
*Lamphere and Van Valkenburgh*
ATTORNEYS Nov. 11, 1952 — O. D. MURRAY — 2,617,203
DRIER
Filed Oct. 13, 1948 — 7 Sheets-Sheet 5

INVENTOR.
Orval D. Murray
BY
Lamphere and Van Valkenburgh
ATTORNEYS

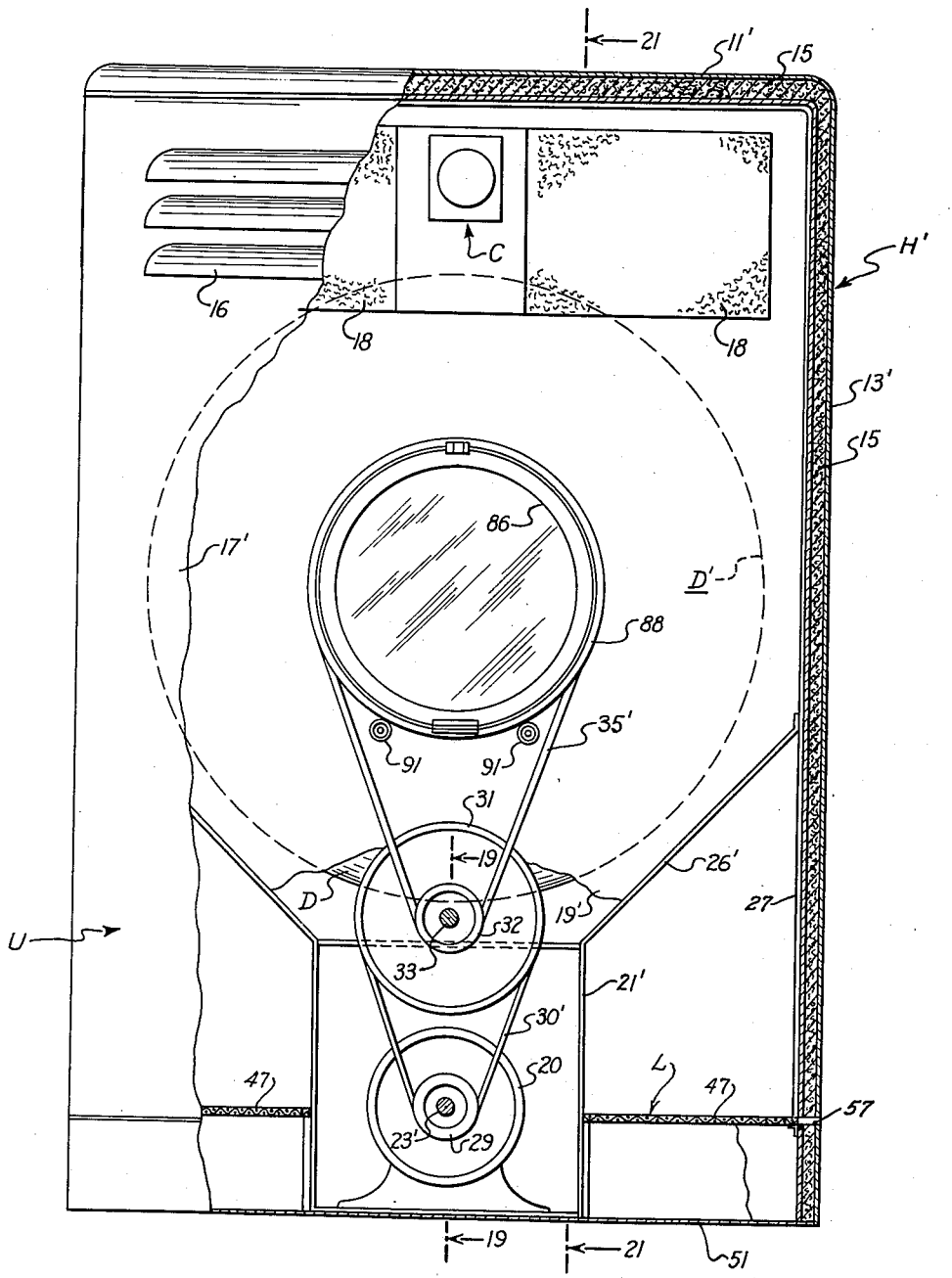
FIG.—18

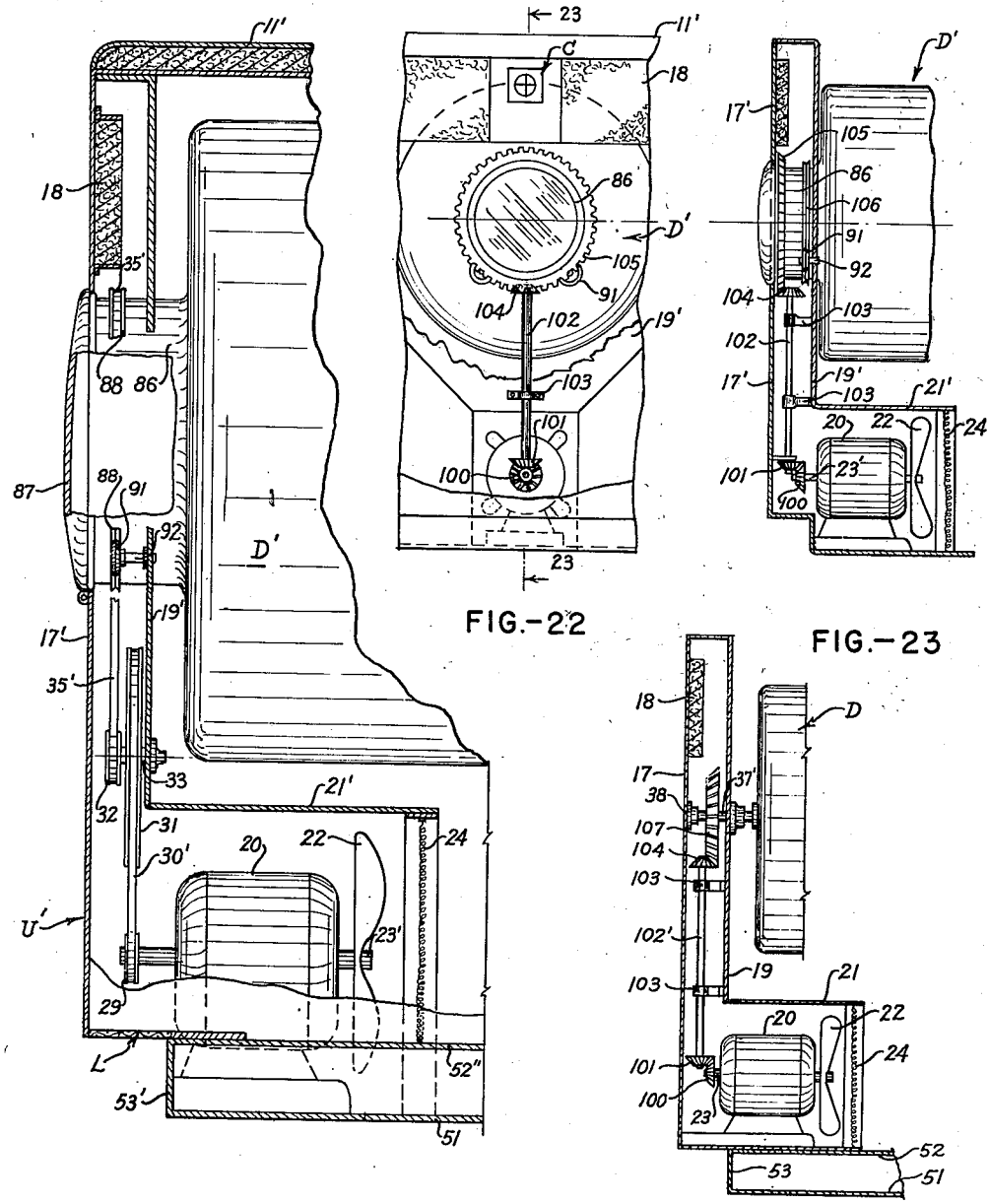

Patented Nov. 11, 1952

2,617,203

UNITED STATES PATENT OFFICE 2,617,203

DRIER

Orval D. Murray, Fort Collins, Colo.

Application October 13, 1948, Serial No. 54,326

16 Claims. (Cl. 34—82)

This invention relates to dryers for clothes and the like, and more particularly to a dryer in which air is heated and passed onto or through the articles being dried, which, in the case of clothes, are preferably rotated in a hollow perforated drum or the like.

Previous dryers of the rotary drum type have usually been constructed so that the machinery and working parts are relatively inaccessible for inspection, adjustment or repair. Also, when the construction is such that clothes or similar articles may be placed in the drum from one end, the drum has usually been supported as an overhanging weight, thus either being inadequately supported or requiring an unduly large shaft and bearings. Also, the motor and drive for rotating the drum is then located at the end opposite the opening, and therefore at the back of the dryer, where it is in a relatively inaccessible position. Sometimes the air intake has been located so close to the air exhaust that the moist air from the exhaust is merely reintroduced, in large part, through the intake. Also, if the air is heated electrically, an undue amount of change in the design of the dryer must be made in order to provide a dryer in which the air for drying may be heated by gas.

Among the objects of the present invention are to provide an improved dryer for clothes and the like; to provide such a dryer which includes a rotary, perforated drum, in which the clothes to be dried are placed; to provide one form of such dryer in which access to the drum is obtained at the top; to provide another form of such dryer in which access to the drum is obtained at the front, at one end of the drum; to provide such a dryer in which the drum is adequately supported, in the case of each form; to provide such a dryer in which either electricity or gas may be utilized as the heating medium without substantial change in the general arrangement of parts; to provide one form of such dryer in which articles other than clothing, such as dishes, toweling, and similar articles which may be dried in stationary position, can be accommodated; to provide such a dryer in which access to all of the operating parts is relatively simple and easy; to provide such a dryer in which access to all of the operating parts may be obtained from the front; and to provide such a dryer which, in its various forms, is sufficiently economical in cost to warrant manufacture on a competitive basis.

Additional objects and the novel features of this invention will become apparent from the description which follows, taken in connection with the accompanying drawings, in which:

Fig. 1 is a front elevation, with certain parts broken away to show the interior construction, of one form of dryer constructed in accordance with this invention;

Fig. 2 is a vertical longitudinal section taken along offset line 2—2 of Fig. 1;

Fig. 3 is a three-dimensional drawing of a front removable section of the dryer of Figs. 1 and 2, which removable section houses the operating parts, along with a portion of the bottom of the dryer;

Fig. 4 is an exploded, three-dimensional drawing of a portion of the drive and drum shafts at the front drum bearing;

Fig. 5 is a fragmentary vertical section taken through the front bearing;

Fig. 6 is an elevation of the front bearing;

Fig. 7 is a vertical section through the rear drum bearing;

Fig. 8 is an elevation of the rear drum bearing;

Fig. 9 is a top plan view of a novel lint catcher, forming a part of the dryer of Fig. 1;

Fig. 10 is a transverse section of the lint catcher, taken along line 10—10 of Fig. 9;

Fig. 11 is a three-dimensional drawing of a drying rack, adapted to be substituted for the drum and to be utilized in drying towels or the like;

Fig. 12 is a three-dimensional drawing of a pan which is also adapted to be substituted for the drum and to be utilized in drying dishes or the like;

Fig. 13 is a three-dimensional view of the dryer of Fig. 1, with the cover open and the rack of Fig. 11 substituted for the drum;

Fig. 18 is a front elevation similar to Fig. 1, with certain parts being broken away to show the interior construction, of another embodiment constructed in accordance with this invention, in which access to the drum is obtained at the front, through the end of the drum;

Fig. 19 is a vertical section taken along line 19—19, through the lower portion of the dryer of Fig. 18;

Fig. 20 is a three-dimensional view of a portion of the service unit and associated parts in the lower portion of the dryer of Fig. 18;

Fig. 21 is a fragmentary vertical section taken along line 21—21 of Fig. 18;

Fig. 22 is a fragmentary front elevation, on a reduced scale with certain parts broken away to show the interior construction, of a construction similar to that of Figs. 18–21, but having an alternative drive arrangement;

Fig. 23 is a fragmentary central vertical section taken along line 23—23 of Fig. 22;

Fig. 24 is a fragmentary central vertical section illustrating the drive arrangement of Fig. 22 applied to the dryer of Fig. 1.

Figure 15:
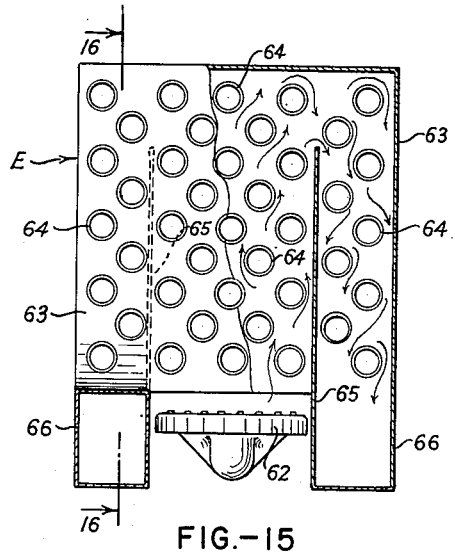
Fig. 15 is a vertical section taken along line 15—15 of Fig. 14, showing a gas burner and heat exchanger, a portion of the heat exchanger being broken away to show the interior construction.
Figure 16:
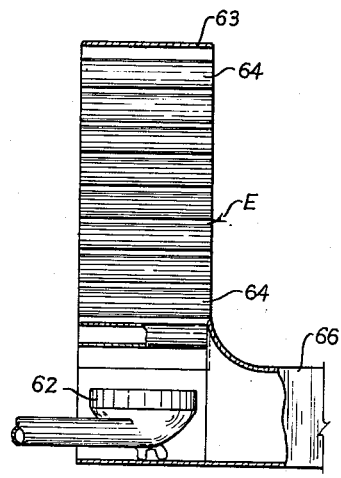
Fig. 16 is a vertical section taken along line 16—16 of Fig. 15.

As illustrated in Figs. 1–3, one embodiment of a dryer constructed in accordance with this invention may comprise a housing H, in which is installed a drum D and a service unit U, the latter of which contains the operating parts for rotating the drum D and is accessible from the front of the housing H. The drum D, as in Fig. 2, may be cylindrical in shape, having holes or perforations 10 through which hot air passes to the articles of clothing or the like placed in the drum for drying. Access to the drum may be obtained by lifting a top 11 of the housing H, and then opening a door 12 in the side of the drum, which may be hinged at one edge and provided with conventional locking lugs or the like at the opposite edge. The top 11, as well as the sides 13 and back 14 of the housing H, may be double-walled and provided with insulation 15. A suitable control unit C may be provided, having one or more control dials in a readily accessible position, as on the front of the dryer, as in Fig. 1, and preferably installed in the service unit U, the parts of the same being conventional in nature, so that the temperature to which the air is heated and/or the speed of movement of the air may be regulated, as well as the drying operation being started and stopped on time.

The service unit U is adapted to form the front wall of the housing H, and it is unnecessary to insulate the housing front or service unit U, since the air to be heated for drying purposes passes through the unit U, thereby insulating the front and preheating the intake air. The intake air passes through louvers 16 in a front plate or panel 17 of the service unit U, and is cleaned by passage through filters 18, mounted on the rear of front plate 17 at each side of control unit C. The air then passes downwardly through a passage formed between front plate 17 and an inner plate 19, and then moves past motor 20, which is disposed within a rectangular housing 21 at the lower end of, and disposed centrally with respect to, the service unit U, as in Fig. 3. A fan 22, which may be directly mounted on and driven by motor shaft 23, pulls the air through the filters 18 and then moves the air past electrical resistance elements 24, which heat the air. The air then strikes a curved baffle 25, as in Fig. 2, to be deflected upwardly and against the drum D. As in Figs. 1 and 3, bars 26 extend diagonally across the space between plates 17 and 19, in order to force the air to flow into motor housing section 21. Also, the side edges 27 of front plate 17 may extend rearwardly so as to fit within or over sides 13 of housing H, to which they are readily attached, as by one or two screws on each side.

As will be evident, the entire service unit U is removable from the front of the dryer, after the drum D has been removed in the manner described below. The drive from the motor 20 to the drum D may include two stages of V-belt and pulley reduction, such as provided by a small pulley 29, mounted on the end of motor shaft 23 opposite fan 22, and connected by a lower V-belt 30 with a large pulley 31, which, along with a small pulley 32, is mounted on a shaft 33 adapted to rotate in bearings 34. Small pulley 32 is connected by an upper V-belt 35 with a large pulley 36, the latter being mounted on a drum drive shaft 37 rotatable in bearings 38 and 39, respectively mounted on plates 17 and 19. The bearings for shafts 33 and 37 are preferably so constructed that after the drum D is removed in the manner described below and the service unit U is disconnected from the housing H and pulled out to the front, front plate 17 may be removed and the bearings may be slipped off the ends of shafts 33 and 37.

To permit the removal of drum D from the housing H, the shafts and bearings for the drum are preferably so constructed that the drum D may be lifted bodily out through the opening provided when top 11 of housing H is raised, and door 12 of drum D is in an upper position, as in Fig. 2. As in Fig. 4, the drum drive shaft 37 may be provided with a slot 40, into which a tongue 41 on the front drum shaft 42 is adapted to fit, tongue 41 being in alignment with door 12 of drum D so that tongue 41 will be vertical when door 12 is in top position, so that the user will know when the drum D may be lifted out of the housing. The inner bearing 39 for drive shaft 37, attached to plate 19, is provided with a slot 43 at its upper end, as in Figs. 5 and 6, so that the tongue 41 may slide therethrough into engagement with the groove 40 in drive shaft 37, or the drum shaft may be removed by passage of the tongue 41 through the slot 43. As in Figs. 2, 7 and 8, the rear drum shaft 44 merely rests in an open top bearing 45, which is attached to the back 14 of housing H. Due to the relatively slow rotation of the drum D, such as about 50 R. P. M., neither the front drum shaft 42 nor the rear drum shaft 44 will tend to fall or jump out of the respective bearings. Also, since a substantial portion of the front drum shaft 42 is supported by bearing 39, there will be no tendency for the tongue 41 to damage the bearing, as by scraping or digging into the same.

As the heated air is deflected upwardly by curved baffle 25, it passes into and around the drum D, thereby picking up moisture from the clothes or other articles being rotated in the drum, and drying the same. After circulating into and about the drum, the air passes forwardly and down along the inner plate 19 of service unit U, thereby tending to preheat the incoming air passing down along the other side of plate 19. As the exhaust air passes downwardly, it is divided into two streams by motor housing section 21, and is discharged through the lint catchers L, either to the front of the dryer, or to the rear. The lint catchers L are of novel construction, being shown in greater detail in Figs. 9 and 10, one half of each lint catcher L comprising one or more layers of wire screen 47 or the like, mounted in a frame 48, and the other half of each lint catcher comprising a solid plate 49. As in Figs. 1-3, the lowermost portion of housing H comprises a hollow, rectangular space 50, formed between a bottom plate 51 and a vertically spaced plate 52, the latter terminating at a point spaced from the front wall plate 53 of space 50, to provide an opening 54 at the upper front edge of space 50. Plate 53, in turn, is spaced rearwardly of the front of the dryer, to provide a foot space at the front, as in Fig. 2, and also provide an air discharge opening at the front. The lint catchers L may be placed with the screen 47 to the front, so that the exhaust air will be discharged through the screen to the front of the dryer, and the solid plate 49 will blank off or close the opening 54, as in Figs. 2 and 3. Or, the position of the lint catchers L may be reversed, so that the exhaust air will be discharged into space 50, after passing through the screens 47, while the solid plate 49 will close or blank off the opening forwardly of plate 53. When the exhaust air is passed into the space 50, it may be discharged from the dryer at the rear, as through louvers 55, formed in the back 14 of housing H.

The lint catchers L may be adjusted in position from the outside of the dryer, as by providing a small aperture 57 in each side 13 in housing H, shown in Figs. 1 and 13, so that the respective lint catcher may be slid out, reversed in position, and slid back, when it is desired to change the discharge of air from front to back. Also, instead of louvers 55, a suitable pipe or conduit may lead from the back 14 of housing H to the outside or to a flue or venting device, as in the second embodiment, to be described later. As will be evident from Figs. 1-3, the service unit U is adapted to be slid in and out of position on horizontal plate 52, as to and then past the dotted position of unit U of Figs. 2 and 3, in which motor housing 21 has been moved to the dotted positions indicated. To support the service unit more adequately, reinforcing members 56, such as bars or channels, may be disposed beneath housing section 21, reinforcement being necessary only to about the rear of the housing section 21, as in Figs. 2 and 3.

Different supports for drying different types of articles may be substituted for the removable drum D, such as the rack R of Fig. 11 or the pan P of Fig. 12. The rack R is provided with a plurality of cross rods 58, on which towels or other flat work, or woolens or nylon hose and the like, adapted or desired to be dried in a stationary position, may be hung. The pan P, as in Fig. 12, may have a flange 59 extending around its upper edge, and a plurality of holes 60 in the sides and bottom thereof, so that dishes, glassware or other articles which might be broken due to rotation and tumbling about in the drum D, can be placed therein and dried in stationary position. As in Fig. 13, the drum D may be removed, and the rack R placed within the housing H, brackets 61 preferably being provided for supporting the same, while the pan P may be placed in the housing with flanges 59 resting on brackets 61, shown also in Fig. 25. As will be evident, other types of pans, racks, or the like may be utilized in place of the drum D.

Figure 14:
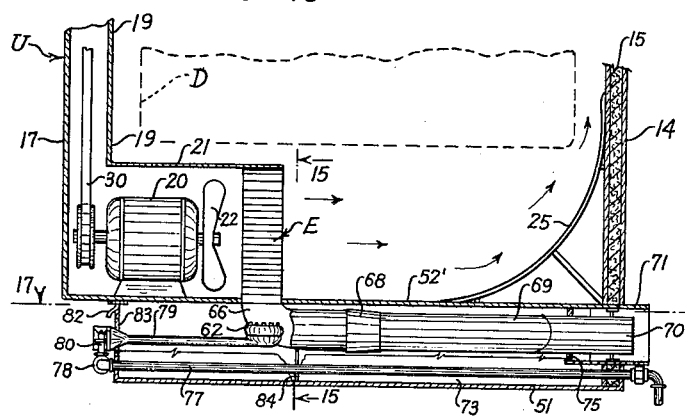
Fig. 14 is a central vertical section of the lower portion of the dryer, illustrating the dryer of Fig. 1 provided with an alternative form of heating unit, in which gas is utilized.

The above embodiment may be converted to the use of gas as a heating fuel, without detracting from the access features of the service unit U, or the passage of the incoming air direct through the service unit, past the motor and through the heater. As in Fig. 14, such embodiment may be converted to the use of gas, merely by mounting a heat exchanger E in housing section 21 just to the rear of fan 22 (in the position previously occupied by electrical resistance heating elements 24), and positioning a gas burner 62 therebeneath. The heat exchanger E may comprise a rectangular shell 63 provided with a plurality of longitudinal tubes 64, through which the air is blown by fan 22, the hot gaseous products of combustion from burner 62 passing upwardly through the central portion of shell 63, around and between the tubes 64 disposed between baffles 65, the hot gases then passing around and down outside baffles 65, around and between the remaining tubes 64.

Figure 17:
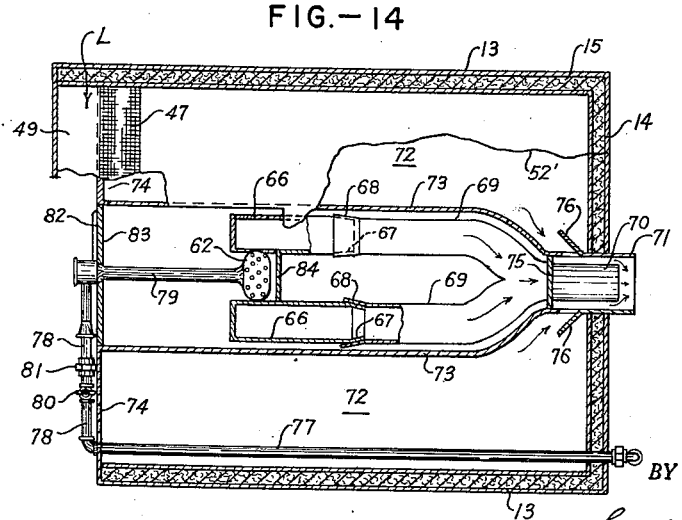
Fig. 17 is a horizontal section, looking downwardly along line 17—17 of Fig. 14.

The exhaust gases from the heat exchanger pass from the lower end of shell 63, at each side of heat exchanger E, through exhaust conduits 66, each of which, as in Fig. 17, may terminate in a circular section having an inwardly tapering end 67, so as to more readily fit into the bell mouth 68 of a fixed exhaust pipe 69. The gas burner 62 is preferably oblong in shape, so as to fit into the space between the exhaust conduits 66, and also to correspond generally to the lateral extent of the central portion of the heat exchanged E, between the baffles 65. The heat exchanger E and gas burner 62 are removable, along with the service unit U, and the connection between the converging ends and bell mouths of the respective exhaust conduits 66 and pipes 69, provides a guide and a seal when the service unit U is placed in the housing, and also permits the service unit U to be removed readily by pulling the same out from the housing. The fixed exhaust pipes 69 converge and join together into a single, combustion products, exhaust tube 70, which terminates within an exhaust pipe connection 71, which may be connected to a chimney, or in any other suitable manner to the outside.

The air heated in heat exchanger E is directed toward the curved baffle 25, as explained previously, and is circulated through and about the clothing or other articles being dried in the drum D, the drive to which from motor 20 may be identical with that previously described. The exhaust air from the dryer may be passed to the outside, at the front of the machine, as described previously, by appropriate positioning of the lint catchers L. Or, the lint catchers L may be positioned as in Fig. 17, so that the heated discharge air will pass into a space or duct 72, at each side of the machine, which spaces are formed by partitions 73 and the side walls 13 of the housing H, spaces 72 being bounded at the rear by rear wall 14 of housing H, at the front by walls 74, on the bottom by bottom plate 51 of housing H, and on the top by spaced plate 52′. The lower end of the heat exchanger E, as well as the fixed exhaust pipes 69, is positioned between partitions 73. The partitions 73 preferably converge toward the rear, following the contour of exhaust pipes 69, while a transverse partition 75 extends between the rear ends of partitions 73 and encircles the combustion products tube 70. The exhaust air from spaces 72 may pass into exhaust connection 71 through the opening provided by outwardly flared plates 76, the combustion products tube 70 preferably extending beyond or to the rear of the opening, so as to insure that all of the products of combustion will pass to the outside, as through a chimney. The plates 76 extend vertically between bottom plate 51 and vertically spaced plate 52' of housing H, while plate 52' extends across the entire lower half of the housing, between side walls 13, up to the heat exchanger E, and then only over the spaces 72, terminating at the front, however, at the lint catchers L.

Gas may be supplied to burner 62 through a pipe 77, to which connection is made at the rear of the machine, and which extends through one of the spaces 72 to the front. A transverse pipe 78 connects the pipe 77 with a burner inlet pipe 79, the transverse pipe 78 being provided with a valve 80 and a union 81 or other suitable disconnectable joint, so that when the service unit U is to be removed from the housing H, the valve 80 may be turned off, the union 81 disconnected, and the burner 62 removed along with the remainder of the service unit U. Air for burners 62 is supplied through louvers 82 in a front plate 83, which extends across the space between partitions 73 when the unit U is in operating position. Plate 83 may also provide support for the motor 20 and other parts within the service unit U, by resting on bottom plate 51 of housing H, while additional support for the heat exchanger E and the service unit may be provided by a vertical plate 84 disposed between the exhaust conduits 66 and which also extends downwardly to rest on the bottom plate 51 of housing H.

As will be evident, the conversion of the embodiment of Figs. 1–3, to the use of gas as a fuel, requires only the addition of the heat exchanger E, gas burner 62 and the associated exhaust system, and conventional gas burner controls, in addition to the installation of partitions 73. If desired, the motor housing section 21 may be made slightly wider than the space between partitions 73, so that the service unit will be supported by the housing section 21 resting on the plate 52', along the edges of the opening between partitions 73.

Particularly when the dryer is to be installed in a limited space, such as under a sink or drain board, and access from the top of the dryer is inconvenient, the drum may be provided with a front access opening, such as in the case of drum D' of the dryer of Figs. 18–21, which forms a second embodiment of this invention. Drum D' has a front opening formed in a neck 86, as in Fig. 21, which extends through an aperture in inner plate 19' of service unit U', and to a corresponding aperture in outer plate 17', while a hinged lid 87 may be provided on outer plate 17', to provide access to the drum opening. The rear shaft of drum D' may be identical with the rear drum shaft 42 of drum D, and the rear bearing therefor may be similar to bearing 43 of Figs. 7 and 8, except that it may be a closed instead of an open top bearing, but similarly mounted on the inner rear wall of the housing. The neck 86 of drum D' is provided with a V-grooved pulley ring 88, engaged by a V-belt 35', which also engages a small pulley 32, mounted on the shaft 33 on which is also mounted large pulley 31, the latter of which is rotated by a V-belt 30', also in engagement with a small pulley 29 on shaft 23' of motor 20. The drive to the drum D, in this embodiment, is similar to that of the first embodiment, except that the V-belt 35' encircles the neck of the drum, and the motor shaft 23', as in Figs. 19 and 21, is somewhat longer than the motor shaft 23 of Fig. 2, as the motor is spaced slightly farther to the rear than the motor of the previous embodiment. For additional support of the longer shaft 23', bearings 89 and 90, or either, may be mounted on front plate 19' and between pulley 29 and motor 20, respectively, as in Fig. 19, or may be omitted, as in Fig. 21.

In accordance with this invention, the front end of the drum D' is supported on V-edged rollers 91 which, as in Fig. 18, engage the pulley ring 88 to each side of the center line of the drum, but between the straight spans of V-belt 35'. As in Fig. 21, each roller 91 may be mounted on a stub shaft 92, attached to the inner plate 19' of service unit U'. The stub shafts 92 are preferably mounted on inner plate 19', so that access to the pulleys, V-belts, etc. may be obtained by removing the outer plate 17'. When the service unit U' is slid out of the housing H, the lid 87 is opened and the drum supported merely by reaching through neck 86. Also, when the service unit U' is replaced, it is merely slid back into position while the drum is supported in the same manner and the rear shaft of the drum guided into engagement with its bearing.

In order that the dryer will have a minimum vertical height, so as to adapt the same to fit under a sink, drain board or the like, the motor 20 and the rectangular housing section 21' enclosing the same, are preferably placed in a lower position, as in Figs. 19 and 20. Thus, the housing section 21' of service unit U' may rest directly on the bottom plate 51 of the housing H'. This requires that the motor be placed farther to the rear than in the previous embodiment, to permit a foot space or ledge to be formed at the front, and it is for this reason that the shaft 23' of the motor is preferably longer than the shaft 23 of Fig. 2. Fan 22 is similarly mounted on the opposite end of the motor shaft 23', while electrical resistance heating elements 24 may be disposed across the rear opening of the housing section 21', in order to heat the air moved past the same by the fan. The deflecting plate or baffle 25', as in Figs. 19 and 20, is provided with a central section 93, which extends down to the bottom plate 51 of the housing H', and which is joined at its edges to a pair of partitions 94 which form a pair of ducts or channels between the bottom plate 51 and spaced plate 52'', forward of section 93. The housing section 21' is also adapted to slide between partitions 94, to the position shown in Fig. 20. The two outer ducts join together at the rear, behind central baffle section 93, and a flue connection 95 may be provided for leading the discharged air to an outside vent, chimney, or the like. Of course, louvers may be provided at the rear, as in the first embodiment. As before, the front edge of plate 52'' terminates short of front wall 53' of each of the ducts, so that the lint catchers L may be placed in a position, either to discharge the exhaust air at the front of the dryer, or through the ducts to the flue connection 95. The lint catchers L, as before, are adapted to be slid in from the sides or mounted in any other suitable manner, so as to be reversible.

The service unit U' is similar to the service unit U of Figs. 1–3, being provided with filters 18 and a control unit C, as in Fig. 18, but the motor housing 21, as in Fig. 19, may be provided with a ledge 96 and an inwardly spaced, short front wall 97, on which bearing 90 may be mounted. The bottom 98 of housing 21' rests directly on plate 51, in the well between partitions 94, as shown also in Fig. 20, while the service unit U' may be slid out to and past the dotted position indicated. The housing H', as in Figs. 18 and 19, is similar to the housing H of Figs. 1-3, the top 11', side walls 13' and rear wall 14' preferably being double and filled with insulation 15. However, the top 11' is not a lid, but is joined to the side and rear walls. As will be evident, the embodiment of Figs. 18 to 21 may be converted to gas heating, in a manner similar to that provided for the first embodiment.

As will be evident, various types of drives other than a combination of pulleys and V-belts may be utilized. Thus, as in Figs. 22 and 23, the embodiment of Figs. 18 to 21 may be provided with a gear reduction drive, which includes a bevel pinion 100 mounted on motor shaft 23' and engaging a bevel gear 101 mounted on the lower end of a vertical shaft 102, adapted to rotate in suitable bearings mounted on brackets 103, in turn mounted on inner plate 19'. A bevel pinion 104 is mounted on the upper end of shaft 102, and is adapted to engage a bevel ring gear 105, mounted on neck 86 of drum D', which also provides considerable speed reduction. The front end of the drum is supported by V-rollers 91 as before, except that a V-ring 106 is preferably mounted on the neck 86 of drum D', so as to rest on the V-rollers, but disposed in a position which does not tend to interfere with bevel pinion 104. If desired, the ring gear 105 and V-ring 106 may be made as a single part, for attachment to the neck 86 of drum D', although they are desirably made separately and mounted in spaced position.

The embodiment of Figs. 1-3 may also be provided with a gear drive, as in the manner shown in Fig. 24, wherein the motor shaft 23 is provided with a bevel pinion 100, engaging a bevel gear 101, the latter being mounted on the lower end of a shaft 102', rotating in bearings in brackets 103. As above, a bevel pinion 104 is mounted on the upper end of shaft 102', but is adapted to engage a bevel gear 107 mounted on drum drive shaft 37'. The inner end of shaft 37' may be provided with a slot, and the front drum shaft provided with a cooperating tongue, as in the embodiment of Figs. 1-3, and more particularly in the manner shown in Figs. 4 and 5. It will be understood, of course, that other types of drives between the motor and the drum may be utilized.

Figure 25:
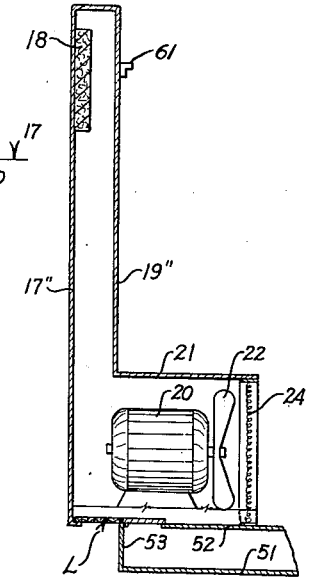
Fig. 25 is a diagrammatic fragmentary vertical section, illustrating a dryer similar to that of Fig. 1, but without a drum and adapted particularly to be used in drying articles in a stationary position, such as in Fig. 13.

If desired, a unit may be made which is adapted to utilize only a rack, pan, or the like, for drying articles in stationary position, in which case it is unnecessary to provide a drive for rotating a drum, as the latter is thus omitted. For such a unit, the housing may be constructed substantially as in Figs. 1-3 and 13, except that a rear bearing for the drum is unnecessary. The service unit for such construction may be made generally as illustrated in Fig. 25, in which motor 20 drives a fan 22, for pulling the air through filters 18, and down through the space between a front plate or panel 17" and an inner plate 19", past motor 20, and then past the electrical resistance heating elements 24, as before. The lint catchers L may be installed in a similar position and used for the same purpose as described previously, and the remaining parts, including motor housing section 21, may be similar to those of Figs. 1-3, or a motor housing section similar to section 21' of Figs. 18-21 may be provided.

From the foregoing, it will be evident that the dryer of this invention fulfills to a marked degree the requirements and objects hereinbefore set forth. An intake air passage in the front wall of the housing reduces the amount of insulation required, and also causes the incoming air to be preheated. The preferred position of the heating unit below the drum causes the circulation of heated air to the drum to be assisted by the normal rise of such heated air, while the preferred discharge of exhaust air from the bottom of the space within the housing assists in insuring that only the coolest air will be discharged. Rotation of the drum also assists in circulation of the air to and about the articles being dried.

As will be evident, the drum is adequately supported in each embodiment of the invention. In the first embodiment, a shaft at each end of the drum provides such support, and in the second embodiment, the V-rollers, which preferably engage the V-belt drive ring, provide support at the front. The use of V-rollers in engaging a V-ring maintains a drum having a front opening in lateral alignment and, particularly when used in association with the V-belt drive, simplifies the construction and at the same time provides adequate support. The conversion of the dryer from heating of the air by electricity to heating of the air by gas, is readily accomplished, involving a minimum of change. In the first embodiment, having a removable drum, it is also relatively easy to remove the drum and install a rack or pan for drying articles in stationary position.

Access to all the operating parts of each form of dryer is relatively easy, since such parts are preferably installed in a service unit which can be removed bodily from the housing at the front. Thus, access not only to the motor, fan and heating unit, but also to the air filters and to the controls, is easy. The ease of access to such operating parts is not diminished by conversion of the unit to heating by gas, since the service unit is just as readily removable, in the construction described, as when electricity is used for heating. The preferred form of construction, when heating by gas is utilized, is also safe and effective, since the gas to the burner may be turned off and the burner removed along with the service unit, and the exhaust connection is preferably such that inter-fitting pipes or conduits are employed. A service unit containing the operating parts and also all wiring, simplifies the installation of such parts, and in fact, the entire construction, in which the service unit may be placed in position as the last operation, is simplified by the readiness of access to all parts prior to final assembly. Thus, manufacturing costs may be reduced to a minimum.

The novel lint catchers of the invention also comprise a valuable feature. These lint catchers not only remove lint from the exhaust air, but are also adapted to be used in changing the direction or manner of exhaust, merely by reversing the same, so that the exhaust air may be discharged at the front, or through an exhaust space formed in the bottom of the housing. Either embodiment may be provided at the rear with louvers for discharge of the exhaust air, or a suitable flue connection may be utilized.

While certain preferred forms of construction have been illustrated and described, it will be understood that various changes may be made therein, in addition to those indicated, and also that other embodiments may exist, all without departing from the spirit and scope of this invention.

What is claimed is:

1. A dryer comprising a housing having an opening in the front wall thereof; and a service unit closing said opening and removable from said housing, said service unit including an enclosed air intake passage adapted to form at least a portion of the front wall of said unit and said unit also containing means for heating air to be passed into the space within said housing; said heating means being disposed rearwardly of said front wall and the lower portion of said service unit rearwardly of said front wall occupying only the central portion of said housing; said front wall extending downwardly to a line spaced above and forwardly of the bottom of said housing and the front of the lower central portion of said unit terminating at points spaced from the sides of said housing; and said housing having an air discharge opening at said line and on each side of the lower central portion of said service unit.

2. A dryer comprising a housing having an opening in a wall thereof; a rotatable drum adapted to contain articles to be dried and mounted in said housing; and a service unit closing said opening and removable from said housing, said unit having an air intake adjacent its upper end and an enclosed air passage extending downwardly and then rearwardly to a point beneath said drum, said service unit also having a motor and drive means for rotating said drum disposed in said air passage and removable with said service unit.

3. A dryer as defined in claim 2, wherein said drive means for said drum includes V-belts and pulleys.

4. A dryer as defined in claim 2, wherein said drive means for said drum includes a vertical shaft and gearing.

5. A dryer as defined in claim 2, wherein said service unit is provided with an air intake and associated air filter, and control mechanism, adjacent the top of said air passage.

6. A dryer as defined in claim 2, wherein said housing is provided with a top adapted to be opened and said drum is removable by being lifted out of said housing when said top is open.

7. A dryer as defined in claim 2, wherein said drum is provided with front and rear shafts; an open top bearing for each said drum shaft and mounted in said housing; and said drive means for rotating said drum includes a drive shaft, said drive shaft and one of said drum shafts having an inter-fitting tongue and slot connection.

8. In a dryer, a service unit removable from a housing having a rotatable drum therein, said service unit including a front panel adapted to form the front of said housing; an inner plate spaced from said front panel, said front panel and inner plate forming therebetween an insulating air intake passage in the front of said housing; a bearing for said drum mounted on said inner plate; a substantially rectangular, lower housing section disposed rearwardly of but connected to said front panel and inner plate and forming a continuation of said air passage; a motor and fan mounted in said lower housing section; means for heating air disposed in said lower housing section rearwardly of said fan; a drive shaft for said drum mounted in said bearing; speed reduction drive means, including V-belts and pulleys, mounted in the space between said front panel and inner plate and forming a drive connection between said motor and said drum drive shaft; an air filter mounted on the inner side of said front panel adjacent the top thereof and at each side, said front panel having louvers for admission of air to said filters; and control mechanism having control dials accessible between said louvers, said control mechanism being mounted on the inner side of said front panel between said filters.

9. A dryer comprising a housing having an open front and double walled, insulated sides, rear and top, said top being hinged so as to form a lid; a cylindrical drum having a plurality of perforations and a hinged door, mounted in said housing; a pair of horizontally extending and vertically spaced plates at the bottom of said housing and forming therebetween an air discharge passage, said plates terminating short of the front end of said housing; a laterally extending vertical partition at the front edge of the lowermost of said plates, the uppermost of said plates terminating at each side at points spaced from said vertical partition, so as to provide an opening leading to the passage between said plates; a service unit as defined in claim 8, said service unit being adapted to close the front of said housing, said lower housing section of said service unit occupying only the lower central portion of said housing beneath said drum and being disposed between said openings leading to the passage between said bottom plates, the lower edge of said front plate of said service unit being at about the level of the uppermost of said housing bottom plates and being spaced forwardly of said vertical partition, so as to form an air discharge opening at each side at the front; a curved baffle disposed rearwardly of said heating means, and extending between the uppermost of said bottom plates to the rear wall of said housing, for deflecting heated air upwardly toward said drum; and a reversible lint catcher at each side of said housing, each said lint catcher being half perforate and half imperforate and thereby being adapted to block either the front discharge opening or the opening to said passage between said bottom plates, and to permit the discharge of air from said housing through the opposite opening or passage.

10. A dryer comprising a housing having an opening in a wall thereof; a service unit closing said opening and removable from said housing and including an enclosed passage for air to be heated and passed into the space within said housing; a heat exchanger for transferring heat to air moving through said passage and through said heat exchanger, said heat exchanger including a rectangular shell and a plurality of tubes extending therethrough, the air to be heated being passed through said tubes; a gas burner mounted on said service unit for supplying hot combustion gases to said exchanger; a pair of baffles extending upwardly in parallel relation to a point spaced from the top of said heat exchanger shell, so that heated gases may pass upwardly from said gas burner around and between the tubes in the central portion of said heat exchanger, and then around and down outside said baffles; an exhaust connection for conveying combustion gases from said exchanger, said exhaust connection including interfitting and disconnectable piping carried by said service unit and said housing, said exhaust connection including a conduit leading rearwardly from the bottom of said shell on each side of said gas burner to terminate at an inwardly tapering end; a pipe for supplying gas to said burner, a section of said pipe being fixed to said housing and a second section of said pipe being fixed to said service unit; a disengageable connection joining said first and second gas pipe sections and including said inwardly tapering ends and a pair of conduits mounted in said housing having bell mouths to receive said tapered ends, said housing conduits converging and joining to form a single combustion products exhaust conduit; a shut-off valve in said first gas pipe section adjacent said disengageable connection; said housing being provided with a bottom air discharge passage including a pair of ducts formed between vertically spaced bottom plates and spaced central partitions extending from the front of said housing alongside said combustion products conduits; said housing also being provided with a flue connection at the rear thereof, into which said single exhaust conduit extends, said flue connection having an opening at each side through which exhaust air from said discharge ducts may pass, said housing having an outwardly flaring partition between said spaced bottom plates at each opening; and said first section of said gas pipe extending from the rear to the front of said housing through one of said ducts, and said shut-off valve and disengageable gas pipe connection being disposed forward of the front wall of such duct, the front lower edge of said service unit being disposed forwardly and above the front of said ducts.

11. A dryer comprising a housing having an open front and double walled, insulated sides, rear and top; a cylindrical drum mounted in said housing and having a plurality of perforations and a front neck forming an access opening; a pair of vertically spaced and horizontally extending plates at the bottom of said housing and laterally spaced, centrally disposed partitions forming between said plates a discharge air passage having a duct at each side and joining at the rear, said plates terminating short of the front end of said housing and said central partitions forming a well therebetween; a vertical partition at the front edge of the lowermost of said plates, the uppermost of said plates terminating at each side at points spaced from said vertical partition, so as to provide an opening leading to the space between said plates; a curved baffle disposed in the lower rear portion of said housing, and extending from the lowermost of said plates and between said partitions to the rear wall of said housing, for deflecting heated air upwardly against said drum; a service unit closing the front of said housing, removable from said housing and including a front panel; an inner plate spaced from said front panel, said front panel and inner plate being adapted to form therebetween an insulating air passage, the lower end of said front panel being spaced forwardly and above the front edge of said lowermost bottom plate, at about the level of said uppermost bottom plate, to form an air discharge opening at each side; a lower, substantially rectangular, housing section disposed rearwardly of said front wall but connected to said inner plate and forming a continuation of said air passage, said housing section being normally disposed in said well; a motor and fan mounted in said lower housing section; means for heating air disposed rearwardly of said fan in said lower housing section; a ring having a V-groove mounted on said drum neck; speed reduction drive means, including V-belts and pulleys, mounted in the space between said front panel and inner plate and forming a drive connection between said motor and said drum, said drive means including a V-belt engaging said V-groove ring; a pair of rollers, each having a V-edge, mounted in said service unit and engaging said V-groove ring to support the forward end of said drum; an air filter mounted on the inside of said front panel adjacent the top thereof and at each side, said front panel having louvers for admission of air to said filters; control mechanism having control dials accessible from the outside and mounted on the inner side of said front panel between said filters; and a reversible lint catcher at each side of said housing, each said lint catcher being half perforate and half imperforate and thereby being adapted to block either the front discharge opening or the opening to said passage between said bottom plates, and to permit the discharge of air from said housing through the opposite opening or passage.

12. A dryer comprising a housing having a drying space adapted to contain articles to be dried and having an opening in the front wall thereof; a service unit closing said opening and removable from said housing, said service unit including an enclosed air passage extending from the upper portion of said unit downwardly and then rearwardly to a point beneath the drying space in said housing; means disposed in the lower portion of said passage for heating air and moving the same into the drying space within said housing; and means for controlling the operation of said dryer and disposed in the upper portion of said air passage, said control means and said heating means both being removable with said service unit.

13. A dryer comprising a housing having an opening in a wall thereof, said housing having a drying space and provided with means for supporting a rack, pan or the like, on which articles to be dried while in stationary position may be placed; a service unit closing said opening and removable from said housing, said service unit including an enclosed air passage extending from the upper portion of said unit downwardly and then rearwardly to a point beneath the drying space in said housing; means disposed in the lower portion of said passage for heating air and moving the same into the drying space within said housing; and means for controlling the operation of said dryer disposed in the upper portion of said air passage, said control means and said heating means both being removable with said service unit.

14. A dryer comprising a housing having a drying space adapted to contain articles to be dried, said housing having an air discharge passage at the bottom thereof with an outlet at the rear and air discharge openings at the front adjacent each side of the bottom, said housing also including an opening to said air discharge passage adjacent each said air discharge front opening; means for supplying heated air to said drying space; and half perforate and half imperforate lint catchers adapted to permit discharge of air through said air discharge passages and block said front openings, and alternatively to be reversed so as to block said openings to said air discharge passages and permit discharge of air through said front openings.

15. In a dryer, a housing having an air discharge opening adjacent a first wall, an alternative discharge opening immediately adjacent said first opening, an air discharge outlet in another wall, and means defining a passage leading from said alternative discharge opening to said outlet; and a reversible lint catcher which is half perforate and half imperforate and is adapted to close either of said openings while permitting discharge of air through the other said opening.

16. In a dryer, as defined in claim 14, wherein said reversible lint catcher comprises a framework extending around a screen over one half thereof, the other half thereof being a solid plate.

ORVAL D. MURRAY.

REFERENCES CITED

The following references are of record in the file of this patent:

UNITED STATES PATENTS

| Number | Name | Date |
|---|---|---|
| 1,427,580 | Collins | Aug. 29, 1922 |
| 1,432,125 | Sargent | Oct. 17, 1922 |
| 1,432,388 | Davis | Oct. 17, 1922 |
| 1,446,994 | Sieben | Feb. 27, 1923 |
| 1,469,980 | Allen | Oct. 9, 1923 |
| 1,537,907 | Wells | May 12, 1925 |
| 2,262,186 | Lindberg | Nov. 11, 1941 |
| 2,369,366 | O'Neill | Feb. 13, 1945 |
| 2,438,995 | Forney | Apr. 6, 1948 |
| 2,477,820 | Pokras | Aug. 2, 1949 |
| 2,498,181 | Reiter | Feb. 21, 1950 |